United States Patent
Xie et al.

(10) Patent No.: US 11,689,972 B2
(45) Date of Patent: Jun. 27, 2023

(54) HANDOVER METHOD, INFORMATION EXCHANGE METHOD, DEVICE AND COMPUTER READABLE STORAGE MEDIUM

(71) Applicants: China Mobile Communication Co., Ltd Research Institute, Beijing (CN); China Mobile Communications Group Co., Ltd., Beijing (CN)

(72) Inventors: Fang Xie, Beijing (CN); Zhuo Chen, Beijing (CN); Liang Liu, Beijing (CN); Na Li, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 64 days.

(21) Appl. No.: 16/966,104

(22) PCT Filed: Jan. 21, 2019

(86) PCT No.: PCT/CN2019/072506
§ 371 (c)(1),
(2) Date: Jul. 30, 2020

(87) PCT Pub. No.: WO2019/149101
PCT Pub. Date: Aug. 8, 2019

(65) Prior Publication Data
US 2021/0037431 A1    Feb. 4, 2021

(30) Foreign Application Priority Data
Jan. 30, 2018    (CN) .......................... 201810089284.4

(51) Int. Cl.
*H04W 4/00*     (2018.01)
*H04W 36/00*    (2009.01)

(52) U.S. Cl.
CPC ... *H04W 36/0027* (2013.01); *H04W 36/0085* (2018.08)

(58) Field of Classification Search
CPC ......... H04W 36/0011; H04W 36/0016; H04W 36/0022; H04W 36/0027; H04W 36/0033;
(Continued)

(56) References Cited

U.S. PATENT DOCUMENTS

| 2014/0106793 A1* | 4/2014 | Lee ...................... H04W 68/00 455/458 |
| 2014/0241317 A1 | 8/2014 | Jamadagni et al. |

(Continued)

FOREIGN PATENT DOCUMENTS

| CN | 105992284 A | 10/2016 |
| CN | 106470389 A | 3/2017 |

(Continued)

OTHER PUBLICATIONS

3GPP TSG RAN WG1 NR Ad Hoc Meeting; R1-1710468; Qingdao, China, Jun. 27-30, 2017.
(Continued)

*Primary Examiner* — Matthew W Genack
(74) *Attorney, Agent, or Firm* — Price Heneveld LLP

(57) ABSTRACT

A handover method, information exchange method, device and computer readable storage medium are provided. In some embodiments, a first network device may acquire multi-connectivity capability information of a candidate second network device during a handover process, so that the first network device may select, based on the multi-connectivity capability information, a candidate second network device capable of providing an multi-connectivity service as a second network device.

11 Claims, 4 Drawing Sheets

(58) Field of Classification Search
CPC ......... H04W 36/0069; H04W 36/0083; H04W 36/0085; H04W 36/0088; H04W 36/0094; H04W 36/28
See application file for complete search history.

(56) References Cited

U.S. PATENT DOCUMENTS

| | | |
|---|---|---|
| 2016/0057687 A1 | 2/2016 | Horn et al. |
| 2016/0127961 A1 | 5/2016 | Wang et al. |
| 2017/0347277 A1 | 11/2017 | Zhang et al. |
| 2018/0049214 A1* | 2/2018 | Kubota ................ H04W 36/32 |
| 2018/0124648 A1* | 5/2018 | Park ................ H04W 36/0005 |
| 2018/0241520 A1 | 8/2018 | Gao et al. |

FOREIGN PATENT DOCUMENTS

| | | |
|---|---|---|
| CN | 106664631 A | 5/2017 |
| CN | 107251601 A | 10/2017 |
| EP | 3096559 A1 | 1/2015 |
| WO | 2014021761 A2 | 1/2014 |
| WO | 2014111499 A1 | 7/2014 |
| WO | 2014205711 A1 | 12/2014 |
| WO | 2017032124 A1 | 3/2017 |

OTHER PUBLICATIONS

3GPP TSG-RAN WG2 Meeting #96; R2-167957; Reno, USA, Nov. 14-18, 2016.

* cited by examiner

HANDOVER METHOD, INFORMATION EXCHANGE METHOD, DEVICE AND COMPUTER READABLE STORAGE MEDIUM

CROSS-REFERENCE TO RELATED APPLICATION

This application is a U.S. national phase application of a PCT Application No. PCT/CN2019/072506 filed on Jan. 21, 2019, which claims a priority to a Chinese patent application No. 201810089284.4 filed in China on Jan. 30, 2018, a disclosure of which is incorporated herein by reference in its entirety.

TECHNICAL FIELD

The present disclosure relates to the field of mobile communication technologies, in particular to a handover method, an information exchange method, device and a computer readable storage medium.

BACKGROUND

In fifth generation (5G) non-standalone (NSA) networking, a long term evolution (LTE) base station is used as a master base station and a new radio (NR) base station is used as a secondary base station, to support LTE-NR multi-connectivity services. The multi-connectivity mentioned herein includes dual-connectivity and triple or more connectivity. In a 5G NSA networking scenario, since a data rate supported by NR is much higher than that supported by LTE, generally, an LTE base station supporting LTE-NR multi-connectivity is preferentially selected as the candidate base station for UE demanding a higher data rate in a handover process (specifically, it may be a handover in multi-connectivity or a handover in single connectivity), in case that multiple candidate LTE base stations have comparable signal qualities, so as to ensure a high data rate for the UE once the UE is connected to the candidate base station.

According to handover mechanisms in the related art, at the beginning of the handover process, a source base station is generally unaware of whether the candidate base station may provide an LTE-NR multi-connectivity service to the UE. Consequently, during the selection of a target base station, it may not be ensured that a selected candidate base station supports LTE-NR multi-connectivity, and as a result, a requirement for providing individualized services to UE demanding high data rates may not be satisfied.

The present disclosure provides a technical solution for exchanging LTE-NR multi-connectivity capability between a source base station and a candidate base station, so as to facilitate a handover of UE to a desirable target base station.

SUMMARY

The present disclosure provides, in some embodiments, a handover method, and the handover method includes:
transmitting, by a first network device, a handover request message associated with user equipment (UE) to at least one candidate second network device;
receiving, by the first network device, a handover request acknowledge message transmitted by the at least one candidate second network device, wherein the handover request acknowledge message carries multi-connectivity capability information of the candidate second network device.

The present disclosure further provides, in some embodiments, another handover method, and the handover method includes:
receiving, by a candidate second network device, a handover request message associated with user equipment (UE) transmitted by a first network device;
transmitting, by the candidate second network device, a handover request acknowledge message to the first network device, wherein the handover request acknowledge message carries multi-connectivity capability information of the candidate second network device.

The present disclosure further provides, in some embodiments, an information exchange method, and the method includes:
acquiring, by a first network device, multi-connectivity capability information of other network device and/or transmitting, by the first network device, multi-connectivity capability information of the first network device to other network device when an interface between the first network device and the other network device is being set up or when a configuration of the first network device or the other network device is being updated through an interface between the first network device and the other network device.

The present disclosure further provides, in some embodiments, a first network device, and the first network device includes:
a transceiver, configured to transmit a handover request message associated with user equipment (UE) to at least one candidate second network device, and receive a handover request acknowledge message transmitted by the at least one candidate second network device, wherein the handover request acknowledge message carries multi-connectivity capability information of the candidate second network device;
a processor, configured to perform handover according to the multi-connectivity capability information of each candidate second network device.

The present disclosure further provides, in some embodiments, a candidate second network device, and the candidate second network device includes a transceiver and a processor, wherein
the transceiver is configured to receive a handover request message associated with user equipment (UE) transmitted by a first network device, and transmit a handover request acknowledge message to the first network device, wherein the handover request acknowledge message carries multi-connectivity capability information of the candidate second network device.

The present disclosure further provides, in some embodiments, another first network device, and the first network device includes:
an information acquisition unit, configured to acquire multi-connectivity capability information of other network device and/or transmit multi-connectivity capability information of the first network device to other network device when an interface between the first network device and the other network device is being set up or when a configuration of the first network device or the other network device is being updated through an interface between the first network device and the other network device.

The present disclosure further provides, in some embodiments, a network device, including a storage, a processor and a computer program stored in the storage and configured to be executed by the processor, wherein the processor is configured to execute the computer program, to implement steps of the foregoing handover method.

The present disclosure further provides, in some embodiments, a computer readable storage medium, storing therein a computer program, wherein the computer program is configured to be executed by a processor, to implement steps of the foregoing handover method.

BRIEF DESCRIPTION OF THE DRAWINGS

To better clarify technical solutions of embodiments of the present disclosure, drawings used in description of the embodiments of the present disclosure are briefly introduced hereinafter. Apparently, the described drawings merely illustrate a part of the disclosed embodiments. A person of ordinary skill in the art may obtain other drawings based on the described drawings without any creative efforts.

DETAILED DESCRIPTION

Figure 1:
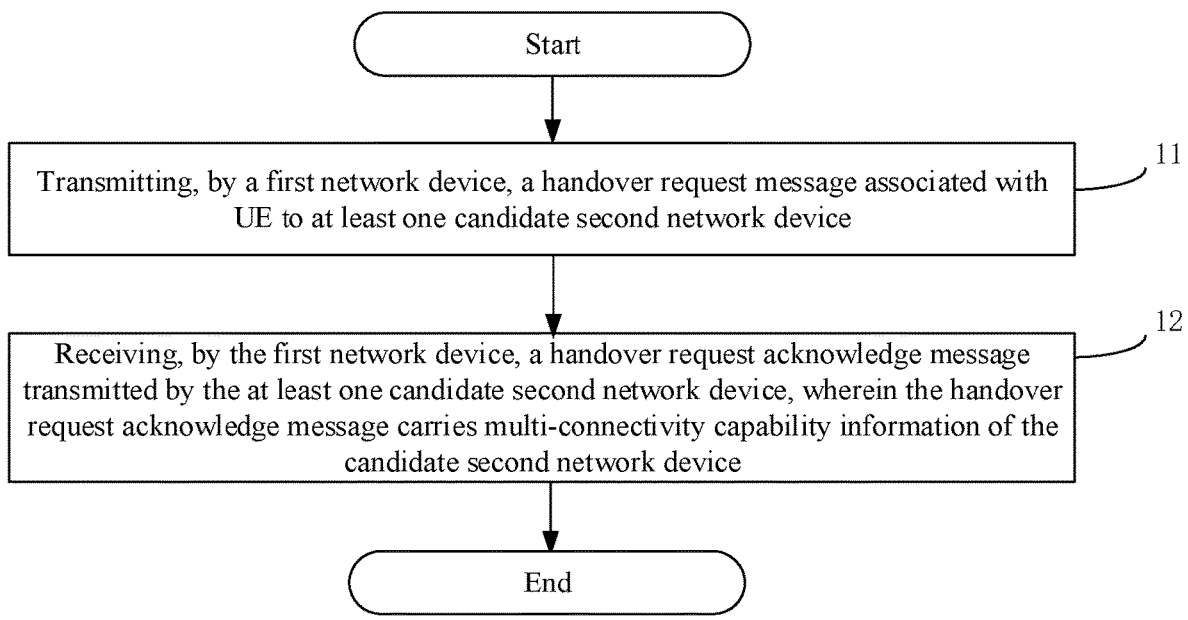
FIG. 1 is a flow diagram of a handover method according to some embodiments of the present disclosure.

To describe the technical problem to be solved, the technical solutions and the advantages of the present disclosure more clearly, embodiments are described in detail hereinafter with reference to the accompanying drawings. In the following description, numerous details such as specific configurations and components are set forth to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

It is understood, "one embodiment" or "an embodiment" mentioned throughout the specification means specific features, structures or characteristics related to the embodiment are included in at least one embodiment of the present disclosure. Therefore, "in one embodiment" or "in an embodiment" mentioned throughout the specification does not necessarily refer to the same embodiment. Additionally, these specific features, structures or characteristics may be combined in any suitable manner in one or more embodiments.

In various embodiments of the present disclosure, it is understood, the numbering of various processes is not intended to imply an execution sequence. The execution sequence of the processes should be determined in accordance with the functions and inherent logic thereof, and by no means constitutes any limitation as to the implementation of the embodiments of the present disclosure.

A technical problem to be solved by the embodiments of the present disclosure is to provide a handover method, an information exchange method, a device and a computer readable storage medium, so as to assist a first network device to select a second network device capable of providing LTE-NR multi-connectivity, which may specifically include evolved universal terrestrial radio access new radio (E-UTRA-NR) multi-connectivity, in a handover process.

The handover method provided in some embodiments of the present disclosure may be applied in a 5G NSA networking scenario. Here, the 5G NSA networking refers to a networking mode in which an LTE base station acts as a master base station and an NR base station acts as a secondary base station. The networking mode may support LTE-NR multi-connectivity services, including E-UTRA-NR multi-connectivity services. Here, the multi-connectivity includes dual-connectivity and triple or more connectivity, such as E-UTRA-NR dual-connectivity (EN-DC), etc. In LTE-NR multi-connectivity, usually an LTE base station is used as the Master base station and an NR base station is used as the secondary base station. Of course, the handover method according to some embodiments of the present disclosure may be applied to multi-connectivity scenarios in other networking modes as well, for example, a multi-connectivity scenario in a networking mode including only one type of base stations (e.g., all base stations are NR base station) or a multi-connectivity scenario in a networking mode including other plural types of base stations.

For ease of description, a description is given below in terms of network device. In the embodiments of the present disclosure, the network device is not limited in form, and may be a macro base station, a pico base station, a Node B (3G mobile base station), an enhanced Node B (eNB), a femto eNB or home eNode B or home eNB or HeNB, a relay station, an access point, a remote radio unit (RRU), a remote radio head (RRH), an NR base station/gNB (5G mobile base station), a network side node in a 5G mobile communication system, such as a central unit (CU) and a distributed unit (DU), etc. The UE may be a mobile phone (or handset), or other devices capable of transmitting or receiving radio signals, including user equipment (UE), a personal digital assistant (PDA), a wireless modem, a wireless communication device, a handheld device, a laptop computer, a cordless phone, a wireless local loop (WLL) station, customer premise equipment (CPE) or an intelligent mobile hotspot capable of converting mobile signals into WiFi signals, an intelligent household appliance, other equipment capable of communicating spontaneously with a mobile communication network without human intervention, or the like. Further, the terms "system" and "network" may be used interchangeably herein.

As shown in FIG. 1, the handover method according to some embodiments of the present disclosure includes following steps.

Step 11 includes: transmitting, by a first network device, a handover request message associated with UE to at least one candidate second network device.

Here, the first network device may be a network device currently serving the UE, e.g., a source base station. The candidate second network device may be a candidate target base station of the handover. When it is required to handover certain UE from a network device serving the UE, the first network device transmits the handover request (Handover Request) message to at least one candidate second network device (e.g., LTE base station), to request a handover of the UE to the candidate second network device.

Step 12 includes: receiving, by the first network device, a handover request acknowledge message transmitted by the at least one candidate second network device, wherein the handover request acknowledge message carries multi-connectivity capability information of the candidate second network device.

Here, the multi-connectivity capability information may be indication information used to indicate whether the candidate second network device supports multi-connectivity. In this case, the indication information may be represented by a 1-bit field. In another implementation, the multi-connectivity capability information may further include information of one or more cells capable of performing multi-connectivity with the candidate second network device. In this case, if a field in the multi-connectivity capability information that indicates the cell capable of performing multi-connectivity with the candidate second network device is null, it represents that the candidate second network device does not support multi-connectivity capability; and if the field is not null, it represents that the candidate second network device supports multi-connectivity capability and indicates a list of cells capable of performing multi-connectivity with the candidate second network device at the same time.

Here, after the handover request message is received by the candidate second network device, the candidate second network device performs an admission control process. If the UE is allowed to be handed over to the candidate second network device, the candidate second network device transmits a handover request acknowledge (Handover Request Acknowledge) message to the first network device. In some embodiments of the present disclosure, the handover request acknowledge message carries multi-connectivity capability information of the candidate second network device. The multi-connectivity capability information may usually include information on whether the candidate second network device may provide multi-connectivity services and information of one or more cells capable of performing multi-connectivity with the candidate second network device.

In some embodiments of the present disclosure, the determination as to whether the candidate second network device provides multi-connectivity services is usually based on factors such as whether the candidate second network device is capable of supporting multi-connectivity, and whether a secondary base station has been added in the case that multi-connectivity is supported. For example, only if the candidate second network device is capable of supporting multi-connectivity and a secondary base station has been added, the candidate second network device may provide multi-connectivity services; otherwise, the candidate second network device may not provide multi-connectivity services.

In a specific implementation, the handover request acknowledge message may only carry information of cells capable of performing multi-connectivity with the candidate second network device. For example, if the carried cell information is null, it represents that the candidate second network device may not provide multi-connectivity services; if the carried cell information is not null, it represents that the candidate second network device supports multi-connectivity services, and a secondary cell of the multi-connectivity services includes a cell whose information is carried in the handover request acknowledge message. The multi-connectivity capability information carried by the handover request acknowledge message may specifically be a quantity of cells capable of performing multi-connectivity with the candidate second network device, or cell identifiers (IDs) of the cells capable of performing multi-connectivity with the candidate second network device; or, a bitmap, wherein bits in the bitmap correspond, in a one-to-one relationship, to cells whose information are carried in the handover request message, and a value of each bit represents whether a corresponding cell is capable of performing multi-connectivity with the candidate second network device. In another word, the handover request acknowledge message may carry a specific quantity of cells or specific cell IDs; or the handover request acknowledge message may indicate whether the candidate second network device may establish multi-connectivity with various cells in the cell set of the handover request message by means of the bitmap. For example, the candidate second network device may establish multi-connectivity with a cell if a value of the bit corresponding to the cell is 1, and the candidate second network device may not establish multi-connectivity with the cell if the value is 0, and, of course, vice versa.

According to some embodiments of the present disclosure, through the aforementioned steps, the first network device may acquire the multi-connectivity capability information of various candidate second network devices for a subsequent handover. For example, subsequent to the above step 12, some embodiments of the present disclosure may further include the following step: performing, by the first network device, a handover according to the multi-connectivity capability information of the various candidate second network devices.

Here, the first network device may acquire, based on the handover request acknowledge messages returned by the various candidate second network devices, information on whether the candidate second network devices are capable of providing multi-connectivity services and, if so, cells capable of performing multi-connectivity with the candidate second network devices. The first network device may maintain multi-connectivity capability information of the candidate second network devices locally on the basis of the handover request acknowledge messages returned by the candidate second network devices. An example of multi-connectivity capability information maintained in the form of a table by a source base station is illustrated in the following table 1. The first column in each row denotes an LTE base station (candidate second network device), and the second column denotes a list of cells capable of performing multi-connectivity with the LTE base station.

TABLE 1

| Base station | LTE-NR multi-connectivity capability information |
|---|---|
| LTE base station 1 | NR cell 1, NR cell 2 |
| LTE base station 2 | NR cell 3 |
| LTE base station 3 | NR cell 4, NR cell 5 |
| . . . | . . . |

Therefore, the first network device may preferentially select, according to multi-connectivity capability information of the various candidate second network devices, a candidate second network device capable of providing multi-connectivity services as a second network device (e.g., a target base station) for handover, and handover the UE to the second network device.

According to some embodiments of the present disclosure, through the aforementioned steps, the first network device may acquire the multi-connectivity capability information of candidate second network devices during a handover process, so that the first network device may select accordingly a candidate second network device capable of providing multi-connectivity services as the second network device, thereby satisfying requirements, in regard to handover, of UE demanding high data rate services and improving network experience for UE.

In some embodiments of the present disclosure, prior to the above step 11, the first network device may receive a measurement report transmitted by UE. The measurement report may include information on cells measured by the UE and cell quality information of the cells. Specifically, the cell quality information may be represented by parameters such as reference signal received power (RSRP), reference signal received quality (RSRQ), and signal-to-noise and interference ratio (SINR). In the above step 11, the first network device may further incorporate information of a cell set in the handover request message. The NR cell set includes all or some of the cells measured by the UE, wherein the some of the cells are selected based on the cell quality information of the cells, e.g., a preset quantity of cells with higher rankings with respect to cell quality are selected, or cells with a cell quality higher than a preset threshold are selected. In this way, having received the handover request message, a candidate second network device may determine whether multi-connectivity may be established with the cells in the NR cell set (i.e., whether the cells in the cell set can act as a secondary cell), and identify a cell capable of performing multi-connectivity as the cell with which the candidate second network device may establish multi-connectivity. Specifically, the candidate second network device may determine whether multi-connectivity may be established with the cells in the cell set by means of a secondary cell addition operation.

In the above implementations, the multi-connectivity capability information of the candidate second network devices is acquired during a handover process. Optionally or additionally, in some embodiments of the present disclosure, network devices may acquire multi-connectivity capability information from each other through interfaces between the network devices (such as X2 interface or Xn interface).

For example, the first network device acquires multi-connectivity capability information of a neighboring network device and/or transmits multi-connectivity capability information of the first network device to a neighboring network device when an interface between the first network device and the neighboring network device is being set up or when a configuration of the first network device or the neighboring network device is being updated through an interface between the first network device and the neighboring network device.

Figure 2:
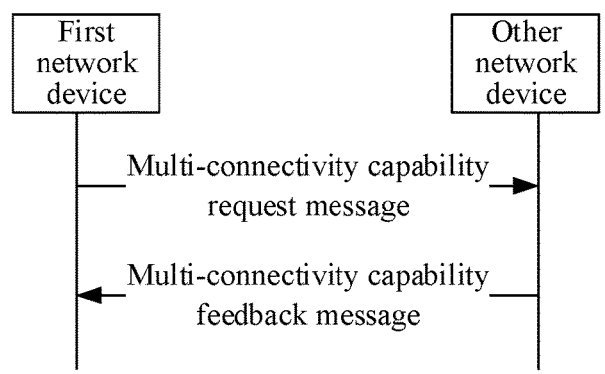
FIG. 2 is a flow diagram illustrating a process of exchanging multi-connectivity capability information between network devices according to some embodiments of the present disclosure.

Specifically, referring to FIG. 2, the first network device may acquire multi-connectivity capability information of a neighboring network device by transmitting a multi-connectivity capability request message to the neighboring network device and receiving a multi-connectivity capability feedback message returned by the neighboring network device that is carrying the multi-connectivity capability information of the neighboring network device.

Figure 3:
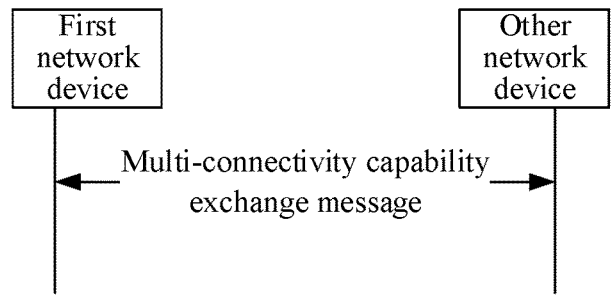
FIG. 3 is another flow diagram illustrating a process of exchanging multi-connectivity capability information between network devices according to some embodiments of the present disclosure.

Referring to FIG. 3, as another implementation, the first network device may transmit multi-connectivity capability information of its own to a neighboring network device by using a multi-connectivity capability exchange message, and acquire multi-connectivity capability information of the neighboring network device by receiving a multi-connectivity capability exchange message transmitted by the neighboring network device.

After the multi-connectivity capability information of the neighboring network device is acquired, in a handover process, the first network device may determine candidates second network devices for handover according to the measurement report transmitted by UE, and select a candidate second network device capable of providing multi-connectivity services as the second network device according to the multi-connectivity capability information of the neighboring network devices, so as to initiate a handover.

The foregoing describes, from the perspective of a first network device, a handover method according to some embodiments of the present disclosure. A processing of a candidate second network device in a handover method according to some embodiments of the present disclosure is described hereinafter.

Figure 4:
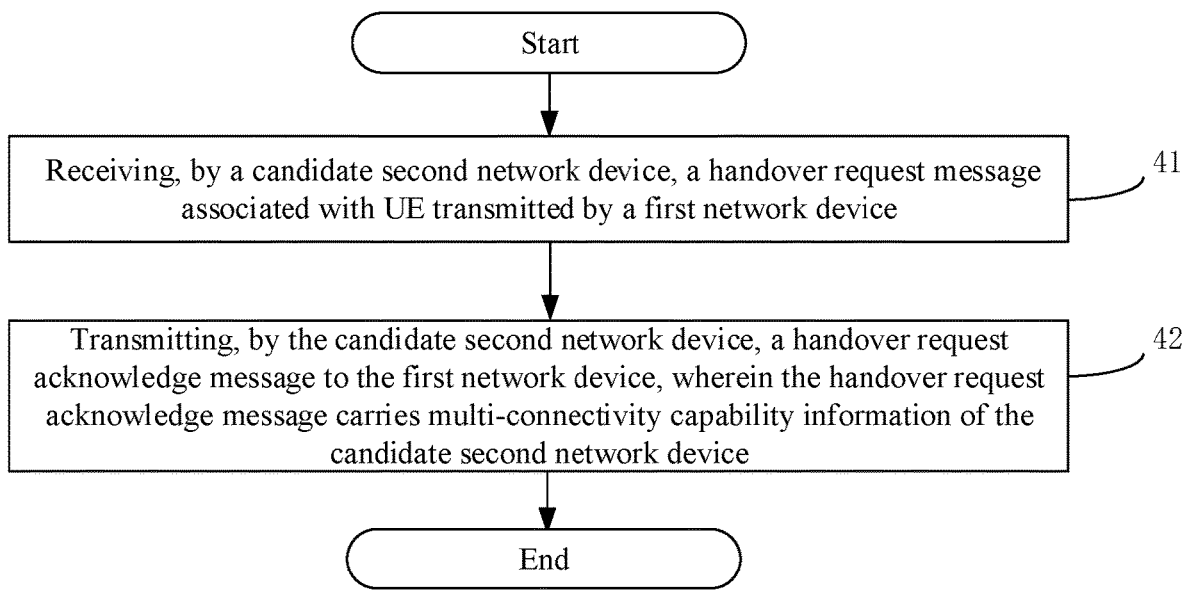
FIG. 4 is another flow diagram of a handover method according to some embodiments of the present disclosure.

Referring to FIG. 4, a handover method applied to a candidate second network device according to some embodiments of the present disclosure includes the following steps.

Step 41 includes: receiving, by a candidate second network device, a handover request message associated with UE transmitted by a first network device.

Here, upon initiating a handover associated with certain UE, the first network device transmits a handover request message to at least one candidate second network device.

Step 42 includes: transmitting, by the candidate second network device, a handover request acknowledge message to the first network device, wherein the handover request acknowledge message carries multi-connectivity capability information of the candidate second network device.

Here, the multi-connectivity capability information may be indication information used to indicate whether the candidate second network device supports multi-connectivity. In this case, the indication information may be represented by a 1-bit field. In another implementation, the multi-connectivity capability information may further include information of one or more cells capable of performing multi-connectivity with the candidate second network device. In this case, if a field in the multi-connectivity capability information that indicates the cell capable of performing multi-connectivity with the candidate second network device is null, it represents that the candidate second network device does not support multi-connectivity capability; and if the field is not null, it represents that the candidate second network device supports multi-connectivity capability and indicates a list of cells capable of performing multi-connectivity with the candidate second network device at the same time.

Here, after the handover request message is received by the candidate second network device, if the UE is admitted, the candidate second network device transmits a handover request acknowledge message carrying multi-connectivity capability information of its own to the first network device.

According to some embodiments of the present disclosure, through the aforementioned steps, a candidate second network device returns the multi-connectivity capability information of its own to the first network device during a handover process, so that the first network device may select accordingly a candidate second network device capable of providing multi-connectivity services as the second network device, thereby satisfying requirements, in regard to handover, of UE demanding high data rate services and improving network experience for UE.

According to some embodiments of the present disclosure, in the step 41, the handover request message transmitted by the first network device may carry a cell set, and the cell set includes all or some of the cells measured by the UE. Prior to transmitting the handover request acknowledge message in the step 42, the candidate second network device may further transmit to a network device corresponding to a first cell a secondary cell addition request message used for adding the first cell, wherein the first cell is a cell in the cell set. The candidate second network device treats the first cell as a cell capable of performing multi-connectivity with the candidate second network device if a secondary cell addition acknowledge (acknowledge) message, used for granting a secondary cell addition and transmitted by the network device corresponding to the first cell, is received by the candidate second network device. Through the foregoing addition process, the candidate second network device may determine whether multi-connectivity may be established with cells in the cell set, and ascertain the multi-connectivity capabilities of the cells measured by UE, such that the secondary cell providing multi-connectivity may be a cell measured by the UE, thereby improving the success rate of multi-connectivity services.

The multi-connectivity capability information carried by the handover request acknowledge message includes: a quantity of cells capable of performing multi-connectivity with the candidate second network device, or cell identifiers (IDs) of the cells capable of performing multi-connectivity with the candidate second network device; or, a bitmap, wherein bits in the bitmap correspond, in a one-to-one relationship, to cells whose information are carried in the handover request message, and a value of each bit represents whether a corresponding cell is capable of performing multi-connectivity with the candidate second network device.

Specifically, the candidate second network device may incorporate a quantity of cells capable of performing multi-connectivity with the candidate second network device, or cell IDs of the cells capable of performing multi-connectivity with the candidate second network device in the handover request acknowledge message. Optionally, the candidate second network device may indicate whether the candidate second network device may establish multi-connectivity with various cells in the cell set of the handover request message by means of the bitmap in the handover request acknowledge message. For example, the candidate second network device may establish multi-connectivity with a cell if a value of the bit corresponding to the cell is 1, and the candidate second network device may not establish multi-connectivity with the cell if the value is 0, and, of course, vice versa.

Similarly, the candidate second network device may acquire multi-connectivity capability information from a neighboring network device through interfaces between the network devices (such as X2 interface or Xn interface). For example, the candidate second network device acquires multi-connectivity capability information of a neighboring network device and/or transmits multi-connectivity capability information of the candidate second network device to a neighboring network device when an interface between the candidate second network device and the neighboring network device is being set up or when a configuration of the candidate second network device or the neighboring network device is being updated through an interface between the candidate second network device and the neighboring network device. Specifically, the candidate second network device may acquire multi-connectivity capability information of a neighboring network device by transmitting a multi-connectivity capability request message to the neighboring network device and receiving a multi-connectivity capability feedback message returned by the neighboring network device that is carrying the multi-connectivity capability information of the neighboring network device. As another implementation, the candidate second network device may transmit multi-connectivity capability information of its own to a neighboring network device by using a multi-connectivity capability exchange message, and acquire multi-connectivity capability information of the neighboring network device by receiving a multi-connectivity capability exchange message transmitted by the neighboring network device.

In summary, in the handover method according to some embodiments of the present disclosure, the first network device acquires the multi-connectivity capability information of candidate second network devices during a handover process, so that the first network device may select accordingly a candidate second network device capable of providing multi-connectivity services as the second network device, thereby satisfying requirements, in regard to handover, of UE demanding high data rate services and improving network experience for UE.

According to an aspect of embodiments of the present disclosure, an information exchange method is provided. The method is applied to a first network device and includes the following step: acquiring, by the first network device, multi-connectivity capability information of other network device and/or transmitting, by the first network device, multi-connectivity capability information of the first network device to other network device when an interface between the first network device and the other network device is being set up or when a configuration of the first network device or the other network device is being updated through an interface between the first network device and the other network device.

Through the step, network devices may acquire multi-connectivity capability information from each other through interfaces between the network devices (such as X2 interface or Xn interface) for a subsequent handover process.

Based on the foregoing methods, the present disclosure further provides, in some embodiments, devices for implementing the methods.

Figure 5:
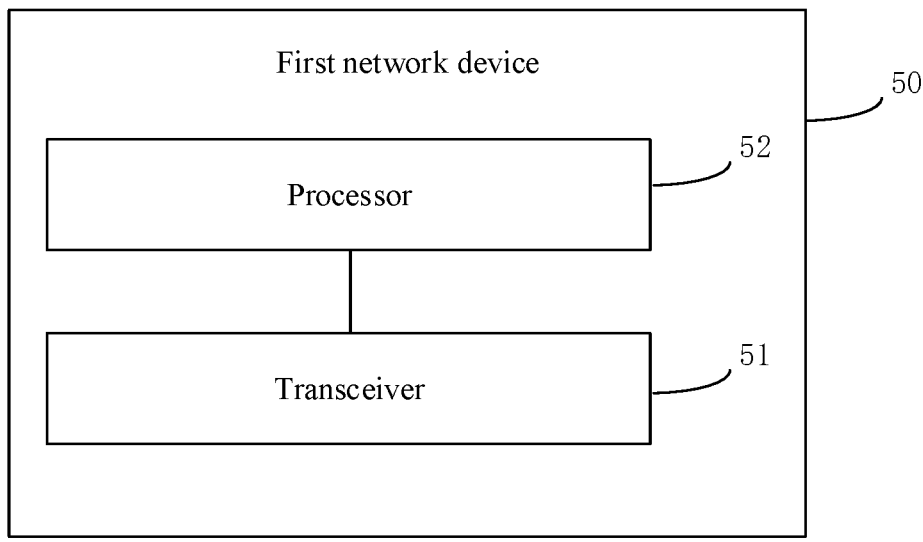
FIG. 5 is a schematic structural diagram of a first network device according to some embodiments of the present disclosure.

Referring to FIG. 5, the present disclosure provides, in some embodiments, a first network device 50, including: a transceiver 51, configured to transmit a handover request message associated with UE to at least one candidate second network device, and receive a handover request acknowledge message transmitted by the at least one candidate second network device, wherein the handover request acknowledge message carries multi-connectivity capability information of the candidate second network device.

In an implementation, a processor 52 may be configured to perform handover according to the multi-connectivity capability information of each candidate second network device.

Here, the multi-connectivity capability information may be indication information used to indicate whether the candidate second network device supports multi-connectivity. In this case, the indication information may be represented by a 1-bit field. In another implementation, the multi-connectivity capability information may further include information of one or more cells capable of performing multi-connectivity with the candidate second network device. In this case, if a field in the multi-connectivity capability information that indicates the cell capable of performing multi-connectivity with the candidate second network device is null, it represents that the candidate second network device does not support multi-connectivity capability; and if the field is not null, it represents that the candidate second network device supports multi-connectivity capability and indicates a list of cells capable of performing multi-connectivity with the candidate second network device at the same time.

Here, as an example, a cell capable of performing multi-connectivity with the candidate second network device may be an NR cell, and each of the first network device and the candidate second network device may be an LTE base station.

In an implementation, before transmitting the handover request message, the transceiver 51 receives a measurement report transmitted by the UE, wherein the measurement report includes information on cells measured by the UE and cell quality information of the cells. The transceiver 51 further incorporates information on all or some of cells measured by the UE in the handover request message, wherein the some of the cells are selected based on the cell quality information of the cells.

In an implementation, before transmitting the handover request message, the transceiver 51 acquires multi-connectivity capability information of a neighboring network device and/or transmits multi-connectivity capability information of the first network device to a neighboring network device when an interface between the first network device and the neighboring network device is being set up or when a configuration of the first network device or the neighboring network device is being updated through an interface between the first network device and the neighboring network device.

Figure 6:
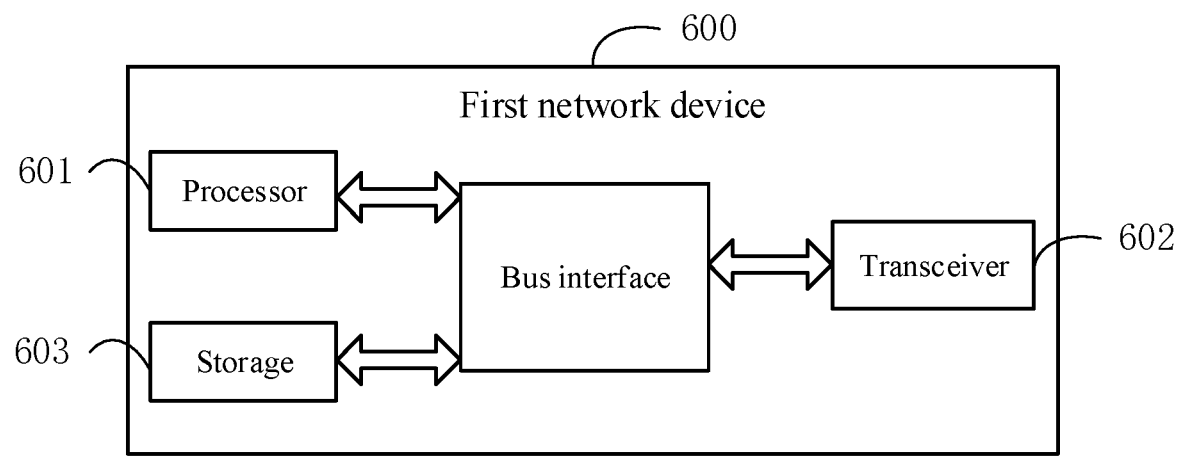
FIG. 6 is another schematic structural diagram of a first network device according to some embodiments of the present disclosure.

Referring to FIG. 6, another schematic structural diagram of a first network device 600 according to some embodiments of the present disclosure is illustrated. The first network device 600 includes: a processor 601, a transceiver 602, a storage 603 and a bus interface.

In some embodiments of the present disclosure, the first network device 600 further includes a computer program stored in the storage 603 and configured to be executed by the processor 601. The processor 601 is configured to execute the computer program to implement the following steps: transmitting a handover request message associated with UE to at least one candidate second network device; receiving a handover request acknowledge message transmitted by the at least one candidate second network device, wherein the handover request acknowledge message carries multi-connectivity capability information of the candidate second network device.

Here, the multi-connectivity capability information may be indication information used to indicate whether the candidate second network device supports multi-connectivity. In this case, the indication information may be represented by a 1-bit field. In another implementation, the multi-connectivity capability information may further include information of one or more cells capable of performing multi-connectivity with the candidate second network device. In this case, if a field in the multi-connectivity capability information that indicates the cell capable of performing multi-connectivity with the candidate second network device is null, it represents that the candidate second network device does not support multi-connectivity capability; and if the field is not null, it represents that the candidate second network device supports multi-connectivity capability and indicates a list of cells capable of performing multi-connectivity with the candidate second network device at the same time.

Optionally, the processor 601 is further configured to execute the computer program to implement the following step: performing a handover according to the multi-connectivity capability information of the candidate second network devices.

In FIG. 6, a bus architecture may include any number of interconnected buses and bridges, and connects various circuits including one or more processors represented by the processor 601 and storages represented by the storage 603. The bus architecture may also connect various other circuits such as peripherals, voltage regulators and power management circuits, which is well known in the art. Therefore, a detailed description thereof is omitted herein. The bus interface acts as an interface. The transceiver 602 may be plural elements, that is, including a transmitter and a receiver, to allow for communication with various other apparatuses on the transmission medium.

The processor 601 is responsible for supervising the bus architecture and normal operation and the storage 603 may store data being used by the processor 601 during operation.

Here, as an example, a cell capable of performing multi-connectivity with the candidate second network device may be an NR cell, and each of the first network device and the candidate second network device may be an LTE base station.

Optionally, the processor 601 is further configured to execute the computer program to implement the following steps: before transmitting the handover request message, receiving a measurement report transmitted by the UE, wherein the measurement report includes information on cells measured by the UE and cell quality information of the cells; and further incorporating information on all or some of cells measured by the UE in the handover request message, wherein the some of the cells are selected based on the cell quality information of the cells.

Optionally, the processor 601 is further configured to execute the computer program to implement the following steps: before transmitting the handover request message, acquiring multi-connectivity capability information of a neighboring network device and/or transmitting multi-connectivity capability information of the first network device to a neighboring network device when an interface between the first network device and the neighboring network device is being set up or when a configuration of the first network device or the neighboring network device is being updated through an interface between the first network device and the neighboring network device.

Figure 7:
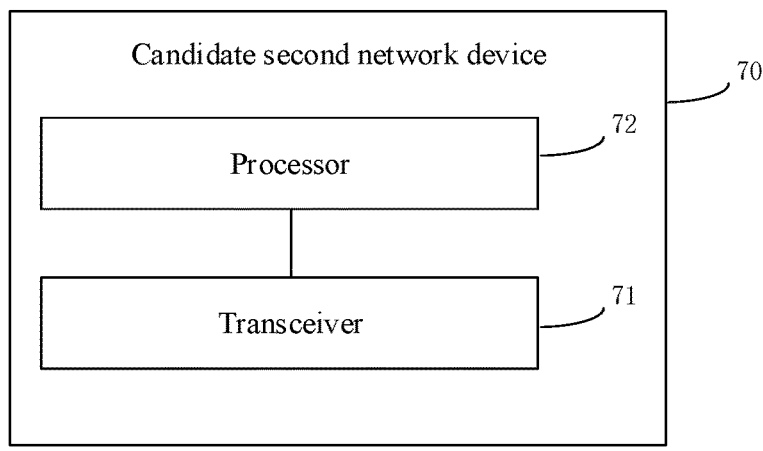
FIG. 7 is a schematic structural diagram of a candidate second network device according to some embodiments of the present disclosure.

Referring to FIG. 7, the present disclosure provides, in some embodiments, a candidate second network device 70, including a transceiver 71 and a processor 72.

The transceiver 71 is configured to receive a handover request message associated with UE transmitted by a first network device, and transmit a handover request acknowledge message to the first network device, wherein the handover request acknowledge message carries multi-connectivity capability information of the candidate second network device.

Here, the multi-connectivity capability information may be indication information used to indicate whether the candidate second network device supports multi-connectivity. In this case, the indication information may be represented by a 1-bit field. In another implementation, the multi-connectivity capability information may further include information of one or more cells capable of performing multi-connectivity with the candidate second network device. In this case, if a field in the multi-connectivity capability information that indicates the cell capable of performing multi-connectivity with the candidate second network device is null, it represents that the candidate second network device does not support multi-connectivity capability; and if the field is not null, it represents that the candidate second network device supports multi-connectivity capability and indicates a list of cells capable of performing multi-connectivity with the candidate second network device at the same time.

Here, as an example, a cell capable of performing multi-connectivity with the candidate second network device may be an NR cell, and each of the first network device and the candidate second network device may be an LTE base station.

Optionally, the handover request message carries information on a cell set, and the cell set includes all or some of cells measured by the UE. Before the transmitting the handover request acknowledge message, the transceiver 71 is further configured to transmit to a network device corresponding to a first cell a secondary cell addition request message used for adding the first cell, wherein the first cell is a cell in the cell set; and treat the first cell as a cell capable of performing multi-connectivity with the candidate second network device if a secondary cell addition acknowledge (acknowledge) message transmitted by the network device corresponding to the first cell is received.

Optionally, before the receiving the handover request message, the transceiver 71 is further configured to acquire multi-connectivity capability information of a neighboring network device and/or transmit multi-connectivity capability information of the candidate second network device to a neighboring network device when an interface between the candidate second network device and the neighboring network device is being set up or when a configuration of the candidate second network device or the neighboring network device is being updated through an interface between the candidate second network device and the neighboring network device.

Figure 8:
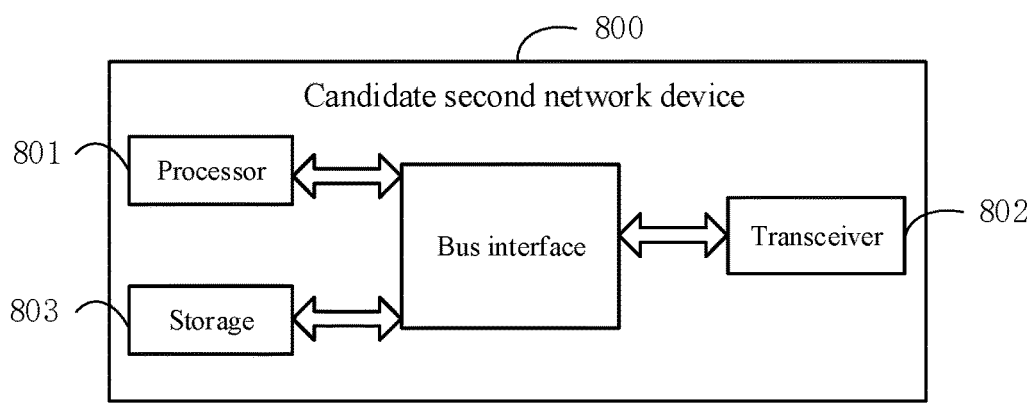
FIG. 8 is another schematic structural diagram of a candidate second network device according to some embodiments of the present disclosure.

Referring to FIG. 8, another schematic structural diagram of a candidate second network device 800 according to some embodiments of the present disclosure is illustrated. The candidate second network device 800 includes: a processor 801, a transceiver 802, a storage 803 and a bus interface.

In some embodiments of the present disclosure, the candidate second network device 800 further includes a computer program stored in the storage 803 and configured to be executed by the processor 801. The processor 801 is configured to execute the computer program to implement the following steps: receiving a handover request message associated with user equipment (UE) transmitted by a first network device; transmitting a handover request acknowledge message to the first network device, wherein the handover request acknowledge message carries multi-connectivity capability information of the candidate second network device.

Here, the multi-connectivity capability information may be indication information used to indicate whether the candidate second network device supports multi-connectivity. In this case, the indication information may be represented by a 1-bit field. In another implementation, the multi-connectivity capability information may further include information of one or more cells capable of performing multi-connectivity with the candidate second network device. In this case, if a field in the multi-connectivity capability information that indicates the cell capable of performing multi-connectivity with the candidate second network device is null, it represents that the candidate second network device does not support multi-connectivity capability; and if the field is not null, it represents that the candidate second network device supports multi-connectivity capability and indicates a list of cells capable of performing multi-connectivity with the candidate second network device at the same time.

Here, as an example, the cell capable of performing multi-connectivity with the candidate second network device is an NR cell, and each of the first network device and the candidate second network device is an LTE base station.

In FIG. 8, a bus architecture may include any number of interconnected buses and bridges, and connects various circuits including one or more processors represented by the processor 801 and storages represented by the storage 803. The bus architecture may also connect various other circuits such as peripherals, voltage regulators and power management circuits, which is well known in the art. Therefore, a detailed description thereof is omitted herein. The bus interface provides an interface. The transceiver 802 may be plural elements, that is, including a transmitter and a receiver, to allow for communication with various other apparatuses on the transmission medium.

The processor 801 is responsible for supervising the bus architecture and normal operation and the storage 803 may store data being used by the processor 801 during operation.

The handover request message carries information on a cell set, and the cell set includes all or some of cells measured by the UE. Optionally, the processor 801 is further configured to execute the computer program to implement the following steps: before the transmitting the handover request acknowledge message, transmitting to a network device corresponding to a first cell a secondary cell addition request message used for adding the first cell, wherein the first cell is a cell in the cell set; and treating the first cell as a cell capable of performing multi-connectivity with the candidate second network device after a secondary cell addition acknowledge message transmitted by the network device corresponding to the first cell is received.

Optionally, the processor 801 is further configured to execute the computer program to implement the following step: before receiving the handover request message, acquiring multi-connectivity capability information of a neighboring network device and/or transmitting multi-connectivity capability information of the candidate second network device to a neighboring network device when an interface between the candidate second network device and the neighboring network device is being set up or when a configuration of the candidate second network device or the neighboring network device is being updated through an interface between the candidate second network device and the neighboring network device.

Figure 9:
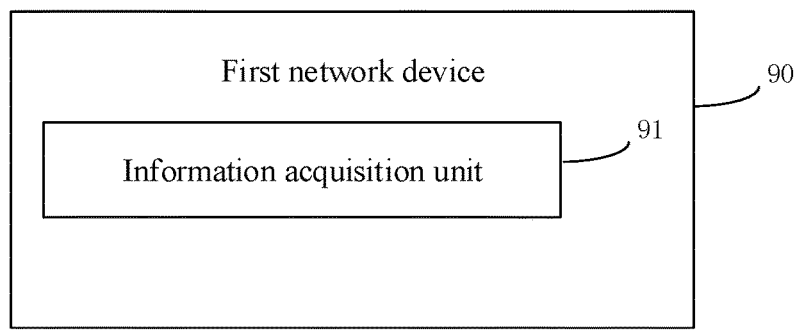
FIG. 9 is another schematic structural diagram of a first network device according to some embodiments of the present disclosure.

Referring to FIG. 9, the present disclosure further provides, in some embodiments, another first network device 90, and the first network device 90 includes: an information acquisition unit 91, configured to acquire multi-connectivity capability information of other network device and/or transmit multi-connectivity capability information of the first network device to other network device when an interface between the first network device and the other network device is being set up or when a configuration of the first network device or the other network device is being updated through an interface between the first network device and the other network device.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a universal serial bus (USB) flash drive, a removable hard disk, an ROM, an RAM, a magnetic disk, or an optical disc.

Compared with the related art, the present disclosure provides, in some embodiments, a handover method, information exchange method, device and computer readable storage medium. The first network device may acquire multi-connectivity capability information of a candidate second network device during a handover process, so that the first network device may select, based on the multi-connectivity capability information, a candidate network device capable of providing an multi-connectivity service as a second network device, so as to satisfy requirements, in regard to handover, of UE demanding high data rate services and improve network experience for UE.

The above descriptions merely describe specific implementations of the present disclosure, but the scope of the present disclosure is not limited thereto. Any modifications, or replacements made by a person skilled in the art without departing from the spirit and principle of the disclosure shall fall within the scope of the present disclosure. Therefore, the scope of the present disclosure is defined by the scope of the claims.

What is claimed is:

1. A handover method, comprising:
transmitting, by a first network device, a handover request message associated with user equipment (UE) to at least one candidate second network device;
receiving, by the first network device, a handover request acknowledge message transmitted by the at least one candidate second network device, wherein the handover request acknowledge message carries multi-connectivity capability information of the candidate second network device;
wherein
the multi-connectivity capability information comprises information of one or more cells capable of performing multi-connectivity with the candidate second network device;
wherein the multi-connectivity capability information carried in the handover request acknowledge message comprises:
cell identifiers (IDs) of the cells capable of performing multi-connectivity with the candidate second network device, or,
a bitmap, wherein bits in the bitmap correspond, in a one-to-one relationship, to cells whose information are carried in the handover request message, and a value of each bit represents whether a corresponding cell is capable of performing multi-connectivity with the candidate second network device;
wherein, prior to transmitting the handover request message, the method further comprises:
acquiring, by the first network device, multi-connectivity capability information of another network device and/or transmitting, by the first network device, multi-connectivity capability information of the first network device to another network device when an interface between the first network device and the another network device is being set up or when a configuration of the first network device or the another network device is being updated through an interface between the first network device and the another network device.

2. The handover method according to claim 1, wherein the indication information is 1 bit in length.

3. The handover method according to claim 1, wherein, prior to transmitting the handover request message, the method further comprises:
receiving, by the first network device, a measurement report transmitted by the UE, wherein the measurement report comprises information on cells measured by the UE and cell quality information of the cells;
incorporating, by the first network device, information on all or some of the cells measured by the UE in the handover request message, wherein the some of the cells are selected based on the cell quality information of the cells.

4. A network device, comprising a storage, a processor and a computer program stored in the storage and configured to be executed by the processor, wherein the processor is configured to execute the computer program, to implement steps of the handover method according to claim 1.

5. A handover method, comprising:
   receiving, by a candidate second network device, a handover request message associated with user equipment (UE) transmitted by a first network device;
   transmitting, by the candidate second network device, a handover request acknowledge message to the first network device, wherein the handover request acknowledge message carries multi-connectivity capability information of the candidate second network device;
   wherein
   the multi-connectivity capability information comprises information of one or more cells capable of performing multi-connectivity with the candidate second network device;
   wherein the multi-connectivity capability information carried in the handover request acknowledge message comprises:
   cell identifiers (IDs) of the cells capable of performing multi-connectivity with the candidate second network device, or,
   a bitmap, wherein bits in the bitmap correspond, in a one-to-one relationship, to cells whose information are carried in the handover request message, and a value of each bit represents whether a corresponding cell is capable of performing multi-connectivity with the candidate second network device;
   wherein, prior to receiving the handover request message, the method further comprises:
   acquiring, by the candidate second network device, multi-connectivity capability information of another network device and/or transmitting, by the candidate second network device, multi-connectivity capability information of the candidate second network device to another network device when an interface between the candidate second network device and the another network device is being set up or when a configuration of the candidate second network device or the another network device is being updated through an interface between the candidate second network device and the another network device.

6. The handover method according to claim 5, wherein the indication information is 1 bit in length.

7. The handover method according to claim 5, wherein the handover request message carries information on a cell set, the cell set comprises all or some of cells measured by the UE, and prior to transmitting the handover request acknowledge message, the method further comprises:
   transmitting, by the candidate second network device, to a network device corresponding to a first cell a secondary cell addition request message used for adding the first cell, wherein the first cell is a cell in the cell set;
   treating, by the candidate second network device, the first cell as a cell capable of performing multi-connectivity with the candidate second network device if a secondary cell addition acknowledge message transmitted by the network device corresponding to the first cell is received by the candidate second network device.

8. A network device, comprising a storage, a processor and a computer program stored in the storage and configured to be executed by the processor, wherein the processor is configured to execute the computer program, to implement steps of the handover method according to claim 5.

9. An information exchange method, comprising:
   acquiring, by a first network device, multi-connectivity capability information of another network device and/or transmitting, by the first network device, multi-connectivity capability information of the first network device to another network device when an interface between the first network device and the another network device is being set up or when a configuration of the first network device or the another network device is being updated through an interface between the first network device and the another network device;
   wherein, in a case of acquiring the multi-connectivity capability information of the another network device, the multi-connectivity capability information comprises cell identifiers (IDs) of one or more cells capable of performing LTE-NR multi-connectivity with the another network device;
   in a case of transmitting the multi-connectivity capability information of the first network device to the another network device, the multi-connectivity capability information comprises cell identifiers (IDs) of one or more cells capable of performing LTE-NR multi-connectivity with the first network device.

10. A network device, comprising a storage, a processor and a computer program stored in the storage and configured to be executed by the processor, wherein the processor is configured to execute the computer program, to implement steps of the information exchange method according to claim 9.

11. A first network device, wherein the first network device maintains multi-connectivity capability information of a second network device locally,
   the multi-connectivity capability information comprises cell identifiers (IDs) of one or more cells capable of performing LTE-NR multi-connectivity with the second network device;
   wherein the first network device acquires multi-connectivity capability information of the second network device from respective handover request acknowledge (ACK) messages returned by the second network device, or acquires multi-connectivity capability information when an interface between the first network device and the second network device is being set up or when a configuration of the first network device or the second network device is being updated through an interface between the first network device and the second network device.

* * * * *